United States Patent
Jayadevan et al.

(10) Patent No.: US 10,212,286 B2
(45) Date of Patent: Feb. 19, 2019

(54) SYSTEM AND METHOD FOR ALLOCATION AND MANAGEMENT OF SHARED VIRTUAL NUMBERS

(71) Applicant: Exotel Techcom Pvt. Ltd., Bangalore (IN)

(72) Inventors: Vishnu Jayadevan, Bangalore (IN); Karthikeyan Krishnamurthy, Bangalore (IN); Siddharth Ramesh, Bangalore (IN)

(73) Assignee: Exotel Techcom Pvt. Ltd., Bengaluru (IN)

( * ) Notice: Subject to any disclaimer, the term of this patent is extended or adjusted under 35 U.S.C. 154(b) by 1 day.

(21) Appl. No.: 15/475,174

(22) Filed: Mar. 31, 2017

(65) Prior Publication Data

US 2017/0289354 A1  Oct. 5, 2017

Related U.S. Application Data

(60) Provisional application No. 62/315,689, filed on Mar. 31, 2016.

(51) Int. Cl.
*H04M 3/523* (2006.01)
*H04L 29/12* (2006.01)
*H04M 3/42* (2006.01)

(52) U.S. Cl.
CPC ............ *H04M 3/523* (2013.01); *H04L 61/20* (2013.01); *H04M 3/42008* (2013.01); *H04M 3/42314* (2013.01); *H04L 61/605* (2013.01)

(58) Field of Classification Search
None
See application file for complete search history.

(56) References Cited

U.S. PATENT DOCUMENTS

| | | | | |
|---|---|---|---|---|
| 5,764,750 A | * | 6/1998 | Chau | H04L 49/105 370/467 |
| 2013/0115921 A1 | * | 5/2013 | Szesztay | H04M 3/42008 455/411 |
| 2015/0071425 A1 | * | 3/2015 | Bennett | H04M 3/42042 379/201.01 |
| 2016/0088162 A1 | * | 3/2016 | Carlos | H04M 7/0075 370/259 |
| 2017/0104713 A1 | * | 4/2017 | Agarwal | H04L 61/106 |

* cited by examiner

*Primary Examiner* — Harry S Hong
(74) *Attorney, Agent, or Firm* — Grandhi Law Chambers; Krishna C. V. Grandhi (57) ABSTRACT

Aspects of the present disclosure provide a system and method in which allocation and management of shared virtual numbers is achieved. In an embodiment, a request is received from an external server, over a network, for allocation and de-allocation of virtual numbers among agents and customers. Thereafter, a first virtual number is allocated and mapped between a first agent and a first customer, and the same first virtual number is also allocated and mapped between a second agent and a second customer. Such allocation and mapping enables communication between corresponding agents and customers. In addition to the allocation, a number may also be de-allocated. For example, the first virtual number mapping between the first agent and first customer can be de-allocated, thereby deactivating the first virtual number for a predetermined time, during which time the first virtual number is not allocated to another combination of a customer and an agent.

14 Claims, 7 Drawing Sheets

SYSTEM AND METHOD FOR ALLOCATION AND MANAGEMENT OF SHARED VIRTUAL NUMBERS

RELATED APPLICATION AND PRIORITY CLAIM

The present disclosure claims priority from co-pending U.S. Provisional Patent Application having the title "A Shared Virtual Number Allocation and Management System", assigned Application No.: 62/315,689, Filed on: 31 Mar. 2016, and is incorporated in its entirety into the present application, to the extent not inconsistent with the disclosure herein.

TECHNICAL FIELD

The disclosed subject matter relates generally to telephony systems. More particularly, the present disclosure relates to a system and method for allocation and management of shared virtual numbers.

BACKGROUND

Cloud telephony providers ("provider") and business that utilize the provider's service ("user") work together to provide a seamless telephone service ("service") to the end consumer ("customer"). Typically, in a mobile communication network, customers to mobile communication services access an operator network by using a unique identification module that contains customer information.

The current scenario of application of cloud telephony usually requires an allocation of virtual numbers to each of the recipients (e.g., call center agents, real estate agents, etc.) that are associated with the respective users that are enrolled in the service, such recipients being generally referred to herein as "agents". For example, in a marketplace application (where the user operates the marketplace), each of the sellers of the marketplace may need to be assigned a unique virtual number which the customers use to contact such agents on an individual and unique basis.

This method of obtaining unique virtual numbers proves to be highly inefficient, as such users usually require hundreds, if not thousands of virtual numbers (e.g., one number for each combination of an agent and a customer), which in turn results in huge expenses for both the user as well as the provider.

In the light of aforementioned discussion, there exists a need for certain system with novel methodologies that would overcome the above-mentioned disadvantages.

SUMMARY

An object of the present invention is directed towards sharing and allowing virtual numbers to be reused.

Yet another object of the present invention is directed towards supporting an almost infinite number of agents and customers where a call can be terminated based on the pair of agent and customer.

In one embodiment of the present invention, a system is provided comprising an external server authorized to request a lead assist layer for allocation and de-allocation of virtual numbers among users over a network. The lead assist layer further comprises an allocation module that is configured to allocate at least one first virtual number for establishing mapping between a first agent and a first customer and further configured to allocate the at least one first virtual number for establishing mapping between a second agent user and a second customer.

In another embodiment of the present invention, the system further comprises a de-allocation module that is configured to de-allocate the at least one first virtual number mapping between the first agent and the first customer and further configured to de-allocate the at least one first virtual number mapping between the second agent and the second customer. The at least one first virtual number mapping is deactivated for a predetermined time.

In yet another embodiment of the present invention, the system further comprises a call handling module that is configured to obtain mappings for the at least one first virtual number and respond to the corresponding mapped agents and customers for establishing the communication and to transmit details of communication to the external server.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Figure 1:
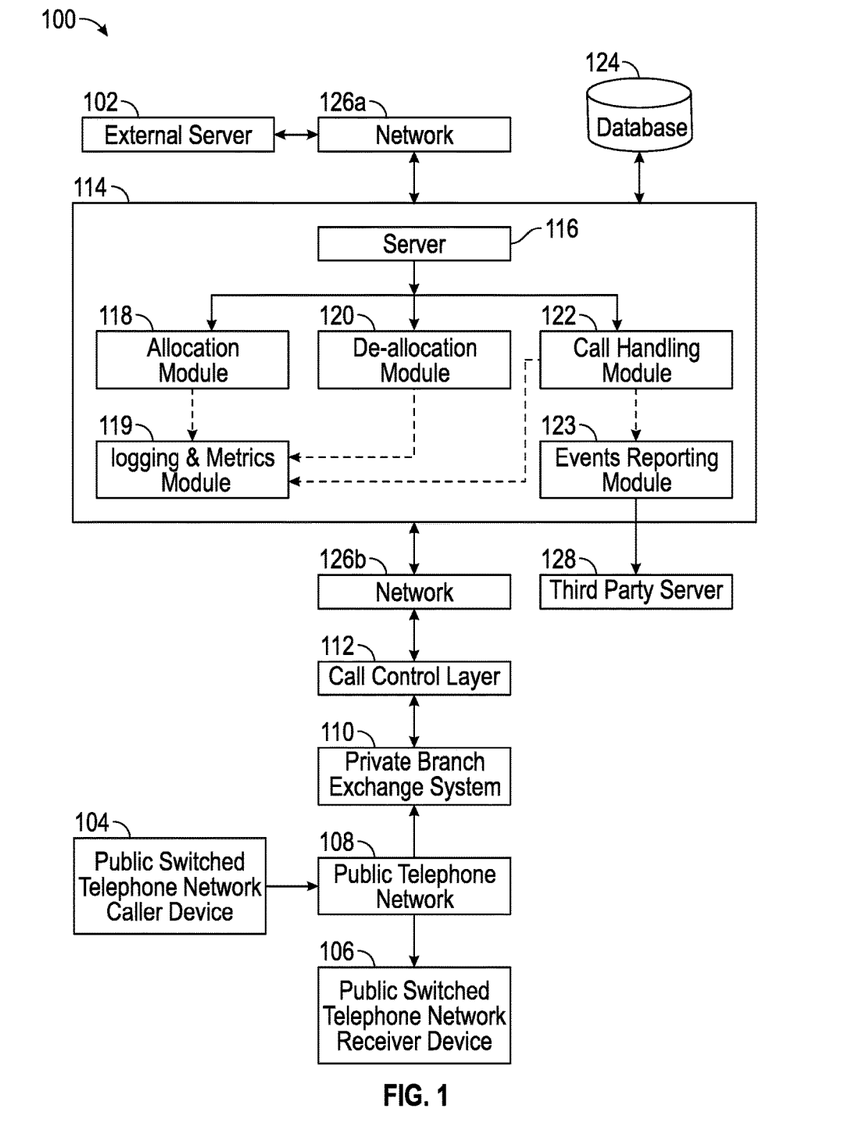
FIG. 1 is a block diagram representing an example environment in which aspects of the present disclosure can be implemented.

Referring to FIG. 1, FIG. 1 is a block diagram 100 representing an example environment in which aspects of the present disclosure can be implemented. Specifically, FIG. 1 depicts a schematic representation of a cloud telephony system according to an embodiment of the present invention. The example environment is shown containing only representative devices and systems for illustration. However, real world environments may contain more or fewer systems or devices. FIG. 1 depicts an external server 102, network 126a and 126b, a public switched telephone network caller device 104, a public switched telephone network receiver device 106, a public telephone network 108, a private branch exchange system 110, a call control layer 112, and a lead assist layer 114. The lead assist layer 114 further includes a server 116, an allocation module 118, a de-allocation module 120, a logging and metrics module 119, a call handling module 122 and an events reporting module 123. FIG. 1 further depicts a database 124, and third party servers 128.

In one or more exemplary embodiments, the public switched telephone network caller device 104 and the public switched telephone network receiver device 106 may include, but not limited to, a handheld device, an internet enabled calling device, an internet enabled calling software, a telephone, a mobile phone, a cordless phone and the like. The initial transaction occurs when the external server 102 requests one or more virtual numbers for agents and customers over the network 126a. The allocation module 118 may allocate one or more virtual numbers for the agents and the customers provided by the external server 102. The de-allocation module 120 may de-allocate one or more virtual numbers for the agents and the customers provided by the external server 102. The virtual number (referring to a single number for clarity, but includes one or more virtual numbers) may be retrieved, allocated and de-allocated from the database 124. The database 124 may be a lead assist database (primary database and cache database), and configured to store the virtual numbers. Unique identifiers may be generated during the allocation, such numbers being used for retrieving the details of the mapping. Unmapped agents and customers may be enabled to communicate with the mapped customers and the agents using PIN numbers associated with the mapping of virtual numbers. The PIN numbers may be collected using the dual tone multi-frequency commands, known in the art.

In one or more exemplary embodiments, the external server 102 may request for a virtual number to be allocated. In such a scenario, all mappings for the particular number may be established. For example, the allocation module 118 may interact with the database 124 for allocating the virtual number. The external server 102 may request for the virtual number to be de-allocated. In such a scenario, all mappings for the particular number may be removed, for example, where the de-allocation module 120 may interact with the database 124 for de-allocating the virtual number. The deactivated virtual number may be put into a vault for a predetermined time. The predetermined time may include specific number of hours and days. The agents and the customers in the public switched telephone network caller device 104 use the public telephone network 108 to call the virtual number which lands on the private branch exchange system 110 maintained by the service provider. The logging and metrics module 119 may be configured to determine activities and further configured to receive the logging details of allocation, de-allocation and call transactions from the allocation module 118, the de-allocation module 120 and the call handling module 122.

In one or more exemplary embodiments, the private branch exchange system 110 is integrated with the call control layer 112 to capture the call event and contact the lead assist layer 114 with the details of the call over the network 126b. The network 126a-126b may include, but not limited to, an ethernet, a wireless local area network (WLAN), or a wide area network (WAN), a WIFI communication network e.g., the wireless high speed internet, or a combination of networks. The network 126a-126b may provide a web interface employing transmission control protocol, hypertext transfer protocol, simple object access protocol or any other internet communication protocol.

In one or more exemplary embodiments, the events reporting module 123 may be configured to report the events and contact the third party servers 128 when specific communication events occur within the flow. The communication events may include but not limited to, duration of calls, starting and ending time of the calls, newly added agents and customers, allocations, de-allocations and the like. The virtual numbers are phone numbers that may be in active state, a vault state and in a deleted state. In active state, call may not connect to the receiver before allocation and call connects when the allocation is done. In vault state, which indicates that a de-allocation request was accepted by the service provider, a vault message may be displayed or transmitted to the caller. In a deleted state, a call never connects to the receiver. Virtual numbers may be provided based on preferences in the request for allocation of such numbers. The preferences may include a preferred region, a preferred number type, a preferred number range and/or prefix/suffix, and the like.

Figure 2:
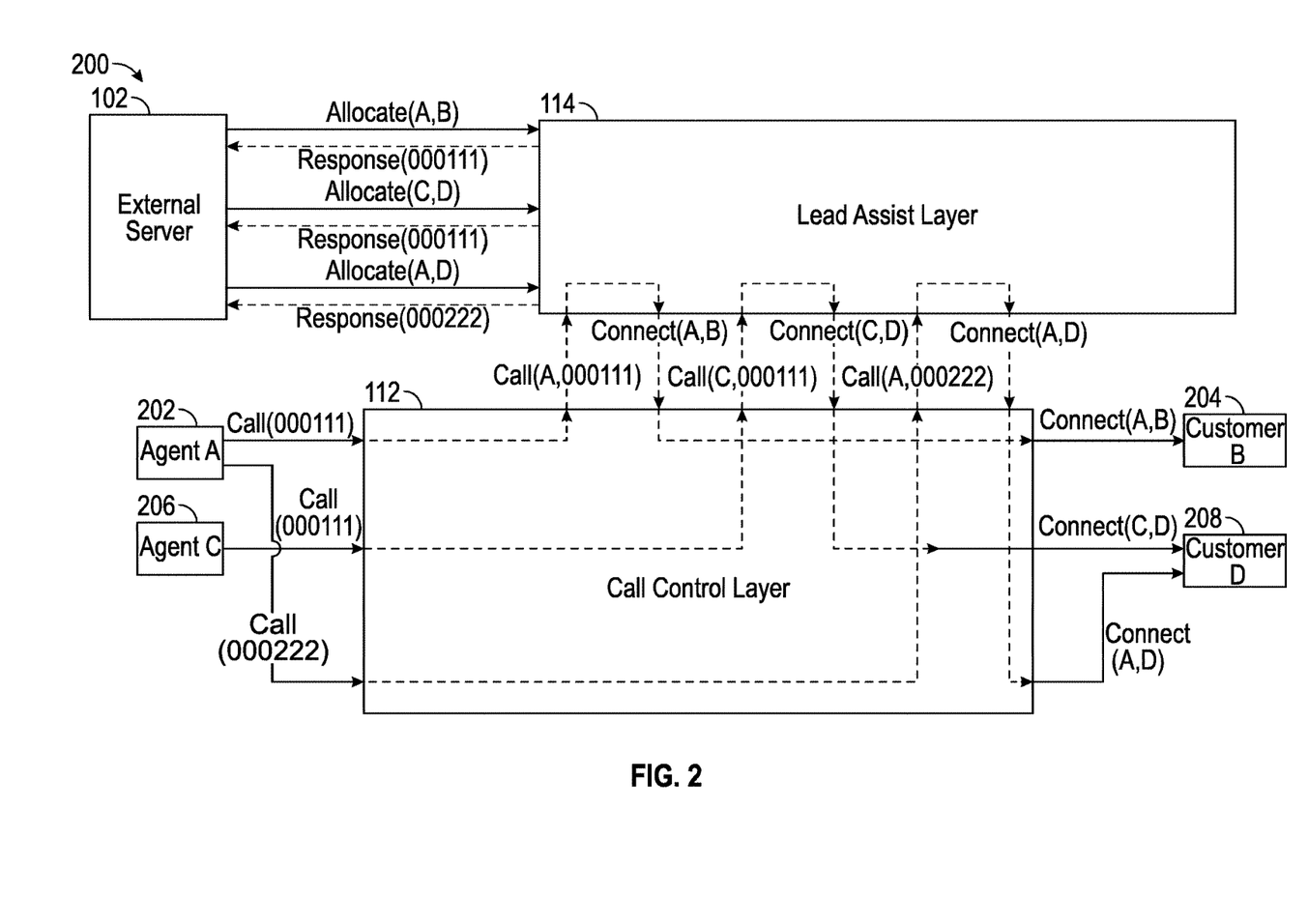
FIG. 2 is an example block diagram which utilizes aspects explained in FIG. 1 to reuse and share virtual numbers, in one or more embodiments.

Referring to FIG. 2, FIG. 2 is an example block diagram 200 which utilizes aspects explained in FIG. 1 to reuse and share virtual numbers, in one or more embodiments. The allocation requests are done by the external server 102 to allocate virtual numbers for agents and customers. The agents may include agent A 202 and agent C 206 and the customers may include customer B 204 and customer D 208. The initial request may be by the external server 102 to allocate the virtual number for agent A 202 and customer B 204. The initial virtual number may be 000111. The lead assist layer 114, via the allocation module 118, allocates the virtual number for the combination of agent A 202 and customer B 204. This mapping (as well as all allocations of virtual numbers, and the ensuing mappings) is also associated with a unique identifier that is stored in the lead assist layer 114 and/or the database 124. The second request from the external server 102 includes allocating a virtual number for agent C 206 and customer D 208. Lead assist layer 114, via the allocation module 118, determines that the intended to-be-allocated virtual number 000111 was not previously mapped between agent C 206 and customer D 208. The lead assist layer 114, via the allocation module 118, thereafter allocates the same virtual number 000111 between agent C 206 and customer D 208.

In one or more exemplary embodiments, a third request from the external server 102 requests a virtual number between agent A 202 and customer D 208. Since the virtual number 0000111 is already allocated between the same agent A 202 and another customer B 204, a different virtual number may be allocated by the allocation module 118 between agent A 202 and customer D 208, from a pool of available virtual numbers. For example, the virtual number allocated between agent A 202 and customer D 208 may be 000222.

When agent A 202 initiates a call to the virtual number 000111, the call control layer 112 captures the call event and contacts the lead assist layer 114 (via network 126b) with the specifics of the call, i.e., for instance the identity of the caller agent A 202 and the identity of the virtual number 000111. The lead assist layer 114, via the call handling module 122, looks up the mapping for the virtual number 000111 for agent A 202 in database 124, whereby it obtains the mapping to customer B 204, and passes this mapping back to the call control layer 112 (via network 126b). The call control layer 112 then initiates a call, through the private branch exchange system 110 (which in turn utilizes the public telephone network 108) to bridge agent A 202 and customer B 204 on a call.

Similarly, when agent C 206 initiates a call to the virtual number 000111, the call control layer 112 captures the call event and contacts the lead assist layer 114 (via network 126b) with the specifics of the call, i.e., for instance the identity of the caller agent C 206 and the identity of the virtual number 000111. The lead assist layer 114, via the call handling module 122, looks up the mapping for the virtual number 000111 for agent C 206 in database 124, whereby it obtains the mapping to customer D 208, and passes this mapping back to the call control layer 112 (via network 126b). The call control layer 112 then initiates a call, through the private branch exchange system 110 (which in turn utilizes the public telephone network 108) to bridge agent C 206 and customer D 208 on a call.

Similarly, when agent A 202 initiates a call to the virtual number 000222, the call control layer 112 captures the call event and contacts the lead assist layer 114 (via network 126b) with the specifics of the call, i.e., for instance the identity of the caller agent A 202 and the identity of the virtual number 000222. The lead assist layer 114, via the call handling module 122, looks up the mapping for the virtual number 000222 for agent A 202 in database 124, whereby it obtains the mapping to customer D 208, and passes this mapping back to the call control layer 112 (via network 126b). The call control layer 112 then initiates a call, through the private branch exchange system 110 (which in turn utilizes the public telephone network 108) to bridge agent A 202 and customer D 208 on a call.

Figure 3:
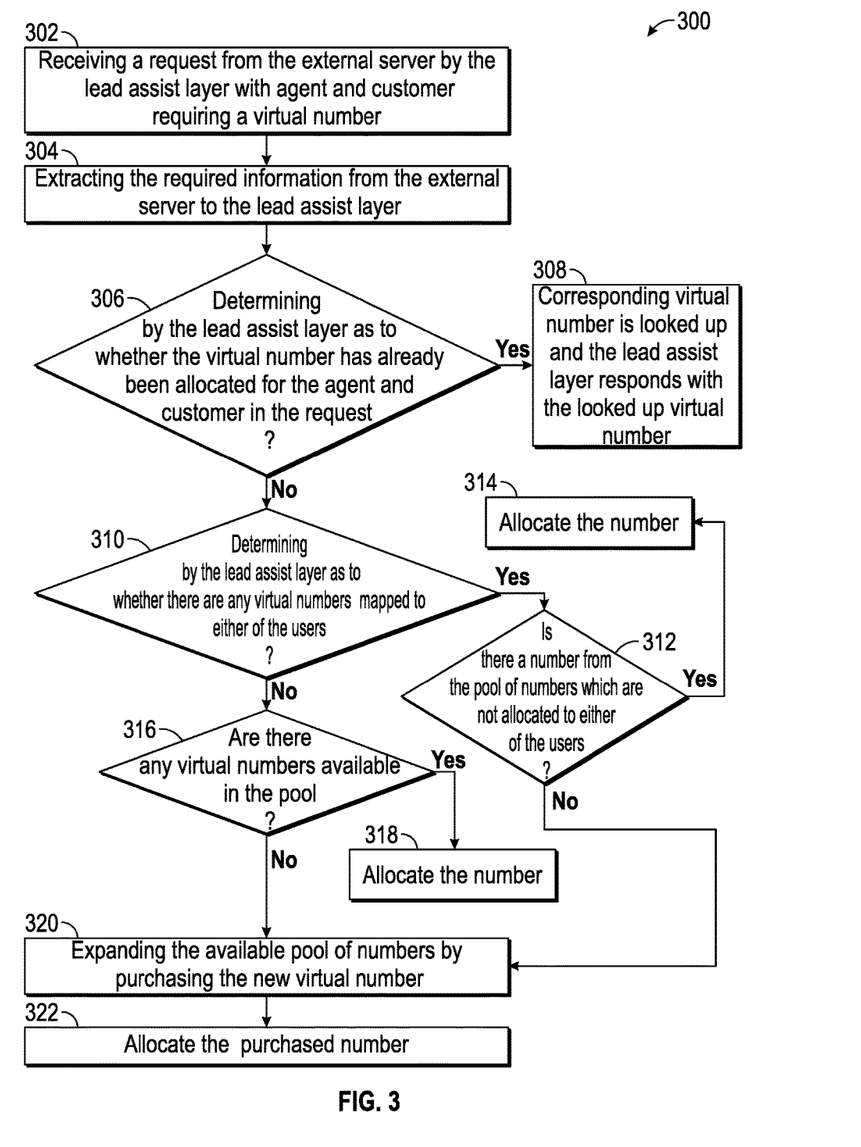
FIG. 3 is a flow diagram depicting the method of allocation of a virtual number between agents and customers, in one or more exemplary embodiments.

Referring to FIG. 3, FIG. 3 is a flow diagram 300 depicting the method of allocation of a virtual number between an agent and a customer, in one or more exemplary embodiments. Method 300 may be carried out in the context of the details of FIG. 1 and FIG. 2. However, method 300 may also be carried out in any desired environment. Further, the aforementioned definitions may equally apply to the description below.

The method commences at step 302, wherein the lead assist layer 114 receives a request from external server 102 for an agent and a customer who require a virtual number allocation. Here, the lead assist layer 114 receives the request over the network 126a. The lead assist layer 114 extracts the required information from the external server 102 at step 304. At step 306, the lead assist layer 114 determines, through the call handling module 122, whether a virtual number has already been allocated for the combination of the agent and the customer identified in the external server request. If the answer to step 306 is a YES, at step 308, lead assist layer 114 looks up the corresponding allocated virtual number from database 124, and responds to external server 102 with the looked up virtual number. If answer to the step 306 is a NO, the method continues to step 310, where the lead assist layer 114 determines, via a look up on database 124, whether there was any virtual number previously allocated/mapped either the agent or the customer. If answer to step 310 is a YES, the method continues to next step 312, where the lead assist layer 114, via the allocation module 118, determines whether a present pool of virtual numbers has a number that is not allocated to either the agent or the customer in the past. If the answer to step 312 is a YES, in step 314, the lead assist layer 114, via the allocation module 118, allocates one such previously-non-allocated-to-either-agent-or-customer virtual number for the combination of the agent and the customer. If the answer to step 312 is a NO, then the lead assist layer 114 may have run out of virtual numbers to allocate from the existing pool. Therefore, the method continues to step 320, where the lead assist layer 114 expands the available pool of virtual numbers by purchasing a new virtual number from, either internally (e.g., from database 124), or from an external source, e.g., from a vendor supplying direct inward dialing/virtual numbers. Then, in step 322, the lead assist layer 114 then, via allocation module 118, allocates the newly purchased number to the combination of the agent and customer as requested by the external sever 102.

If answer to the step 310 is a NO, then the method continues to step 316, wherein the lead assist layer 114 determines whether there are any additional virtual numbers available in the pool for allocation, from the database 124. If answer to the step 316 is YES, then at step 318, the lead assist layer 114, via its allocation module 118, allocates a virtual number, which was not presently mapped to either of the agent and the customer. If answer to the step 316 is a NO, then the lead assist layer 114 may have run out of virtual numbers to allocate from the existing pool. The method will then continue to step 320, where the lead assist layer 114 expands the available pool of virtual numbers by purchasing a new virtual number from, either internally (e.g., from database 124), or from an external source, e.g., from a vendor supplying direct inward dialing/virtual numbers. The method then moves to step 322, where the lead assist layer 114, via allocation module 118, allocates the newly purchased number to the combination of the agent and customer as requested by the external sever 102.

Figure 4:
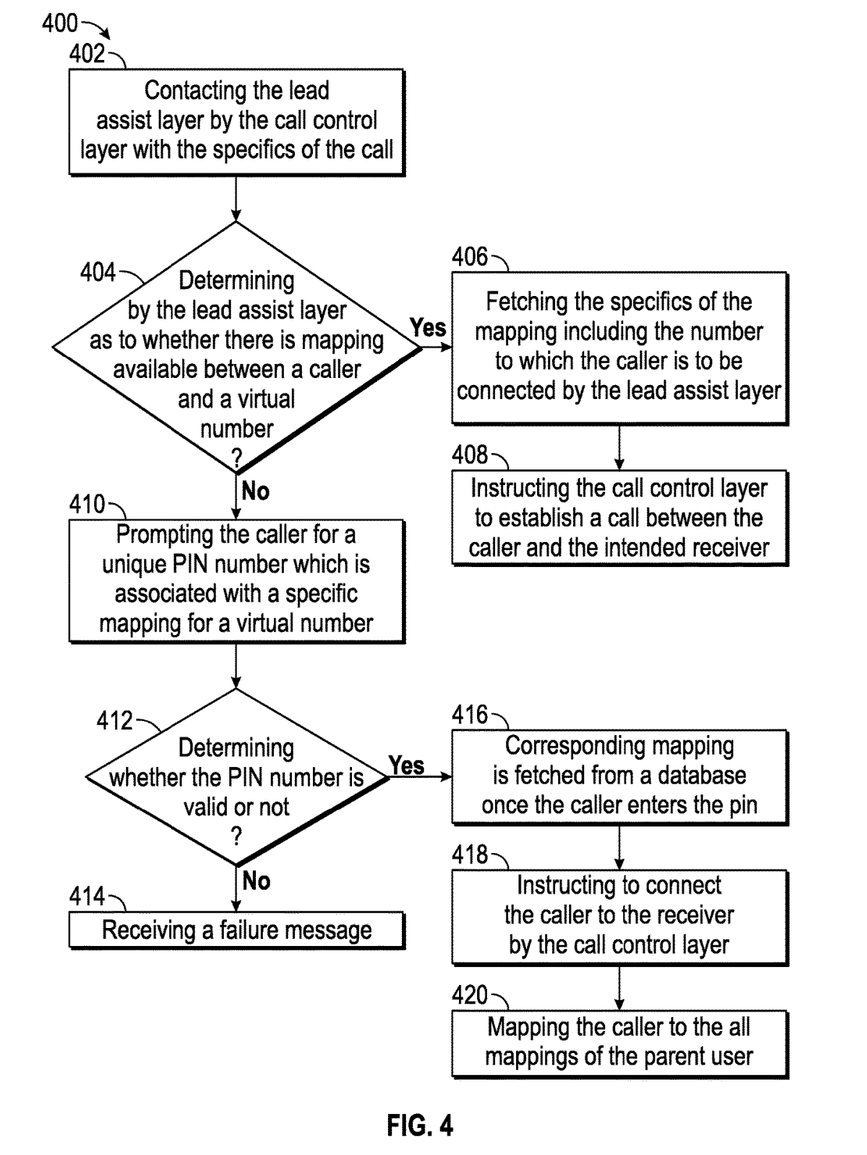
FIG. 4 is a flow diagram depicting the workflow of calls between agents and customers, in one or more exemplary embodiments.

Referring FIG. 4, FIG. 4 is a flow diagram 400 depicting the workflow of calls between an agent and a customer, in one or more exemplary embodiments. As an option, method 400 may be carried out in the context of the details of FIG. 1, FIG. 2 and FIG. 3. However, method 400 may also be carried out in any desired environment. Further, the aforementioned definitions may equally apply to the description below.

The method commences at step 402, when the call control layer 112 contacts the lead assist layer 114 (via network 126b) with the specifics of a call, for instance, the identity of a caller and the identity of a virtual number. At step 404, the call handling module 122 of the lead assist layer 114 determines whether there is an existing mapping available between the caller and the virtual number. If answer to step 404 is a YES, then, at step 406, the lead assist layer 114 fetches the specifics of the mapping between the caller and the virtual number from database 124, including the number to which the caller is to be connected. Thereafter, at step 408, the lead assist layer 114, through the call handling module 122, instructs the call control layer 112 (via network 126b) to establish a call between the caller and an intended receiver. If answer to the step 404 is a NO, at step 410, the lead assist layer 114, through the call handling module 122, prompts the caller for a unique PIN number. This entered PIN number allows a caller to connect with a receiver, e.g., an agent, without the need for the caller to have been previously mapped with the agent. In this case, where a mapping would have otherwise required two separate entities at two ends of the mapping to have been previously mapped, the PIN number takes place of one end of the mapping. Thereafter, if a PIN number is entered by the caller, at step 412, the lead assist layer 114, through the call handling module 122, determines whether the entered PIN number is valid.

If the answer to the step 412 is a NO, meaning that the entered PIN number is not valid, the lead assist layer 114 sends a failure message to the call control layer 112 (via call handling module 122 and network 126b). If the answer to step 412 is a YES, i.e., the entered PIN number is valid, at step 416, a corresponding mapping to the call recipient is fetched from the database 124—i.e., the mapping between the virtual number and the PIN number is fetched. Thereafter, at step 418, the lead assist layer 114, through the call handling module 122, instructs call control layer 112 (via network 126b) to connect the caller to the receiver. The caller (i.e., the caller's number, identity, and any other additional numbers that the caller is able to add to their profile using the PIN number) is then mapped to all the mappings of the caller user—i.e., if the caller had previous mappings done, the new number from which the caller calls or the new numbers which have been used by the caller, will all be associated with the caller's other/previous mappings.

Figure 5:
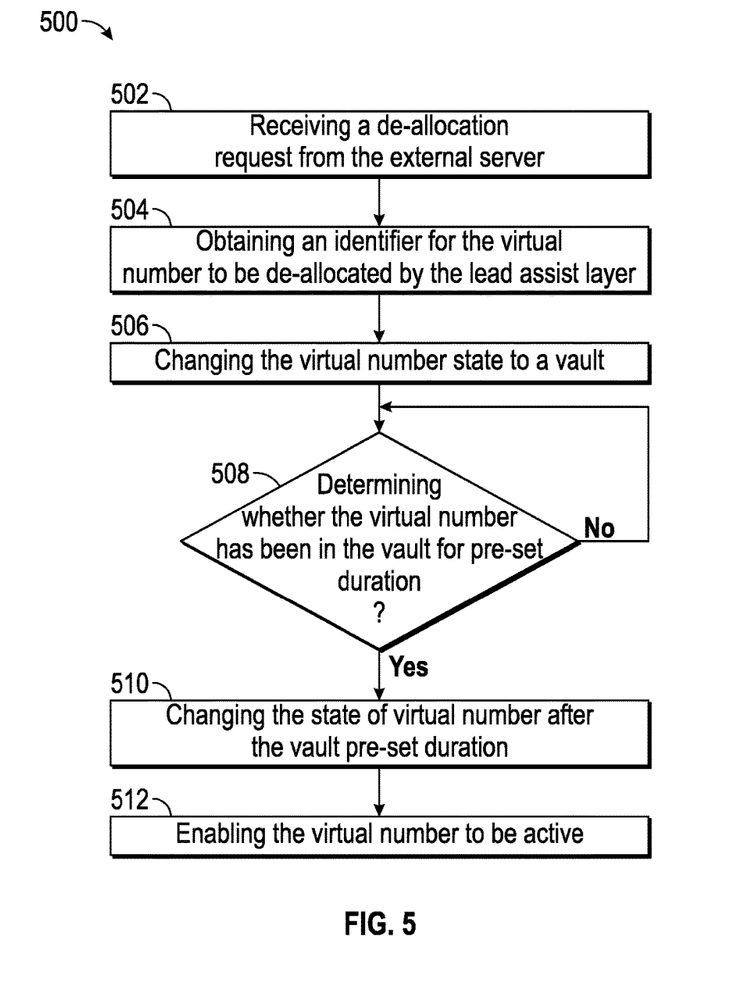
FIG. 5 is a flow diagram depicting the method of de-allocation of a virtual number between agents and customers, in one or more exemplary embodiments.

Referring to FIG. 5, FIG. 5 is a flow diagram 500 depicting the method of de-allocation of a virtual number between an agent and a customer, in one or more exemplary embodiments. Method 500 may be carried out in the context of the details of FIG. 1, FIG. 2, FIG. 3 and FIG. 4. However, method 500 may also be carried out in any desired environment. Further, the aforementioned definitions may equally apply to the description below.

The method commences at step 502, where the lead assist layer 114 receives a de-allocation request from the external server 102. At step 504, the de-allocation module 120 of the lead assist layer 114 then obtains the unique identifier for the virtual number to be de-allocated. Once the identifier is determined, at step 506, the de-allocation module 120 of the lead assist layer 114 changes the state of the virtual number to a vault state. As described earlier, vault state indicates that a de-allocation request was accepted by the service provider. Further, when callers call a virtual number in a vault state, a vault message may be displayed or transmitted to the caller. At step 508, the de-allocation module 120 of the lead assist layer 114 determines whether the vault-state virtual number has been in the vault for a pre-set duration, e.g., for a certain number of minutes, days, weeks, or months. If the answer to step 508 is a NO, the checking loop of step 508 continues. If the answer to the step 508 is a YES, then at step 510, the de-allocation module 120 of the lead assist layer 114 changes the state of the virtual number to a non-vault state. Step 510 may also be viewed as a decision step, where the de-allocation module 120 of the lead assist layer 114 decides to change the state of the then-vault-stated virtual number. At step 512, the de-allocation module 120 of the lead assist layer 114 enables the virtual number for re-use as an active virtual number, i.e., for reuse between an agent and a customer.

Figure 6:
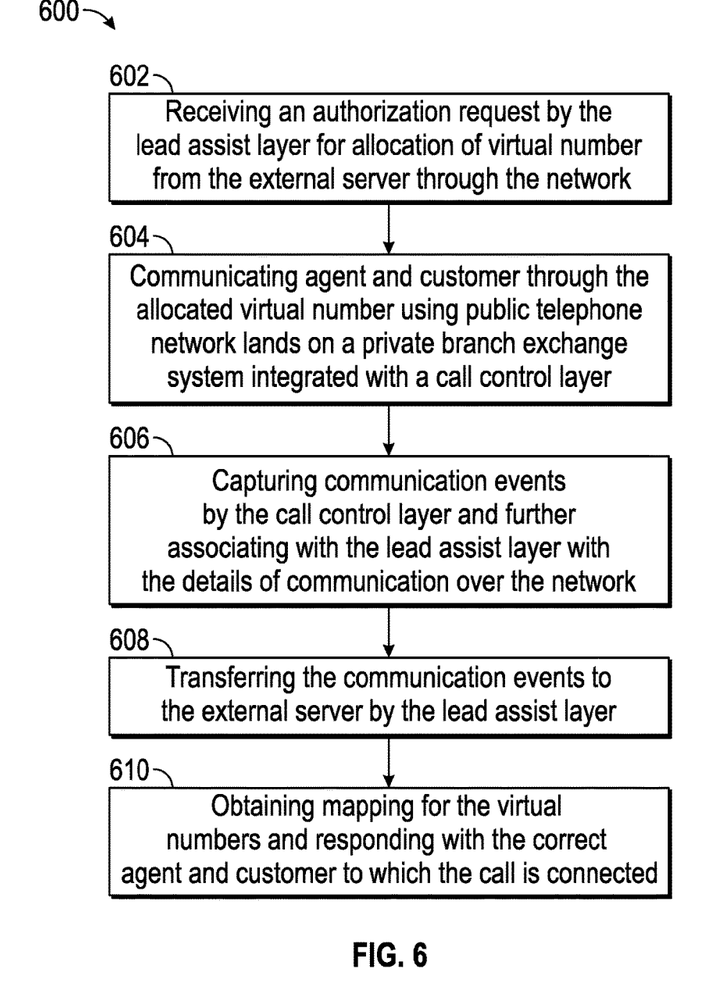
FIG. 6 is a flow diagram depicting a method for allocation and management of shared virtual numbers, in one or more exemplary embodiments.

Referring to FIG. 6, FIG. 6 is a flow diagram 600 depicting a method for allocation and/or re-allocation and management of shared virtual numbers, in one or more exemplary embodiments. Method 600 may be carried out in the context of the details of FIG. 1, FIG. 2, FIG. 3, FIG. 4 and FIG. 5. However, method 600 may also be carried out in any desired environment. Further, the aforementioned definitions may equally apply to the description below.

The method commences at step 602, where the lead assist layer 114 receives an authorization request from the external server 102, through the network 126a, for allocation/re-allocation of a virtual number. Thereafter, per step 604, the agent and customer may communicate with each other through the allocated virtual number using a public telephone network. Such a communication (i.e., the call) lands on a private branch exchange system (e.g., one that is managed and/or operated by the provider), integrated with a call control layer 112, via the public telephone network 108. As described previously, the private branch exchange system 110 is integrated with the call control layer 112 to capture the call event and contact the lead assist layer 114 with the details of the call over the network 126b. Per step 606, the call control layer 112 may be configured to capture the communication events, and to associate the lead assist layer 114 with the details of communication over the network. As described previously, the logging and metrics module 119 may be configured to determine activities and further configured to receive the logging details of allocation, de-allocation and call transactions from the allocation module 118, the de-allocation module 120 and the call handling module 122. Per step 608, the lead assist layer 114 may transfer the communication events to the external server, via its events reporting module 123. As described earlier, the events reporting module 123 may be configured to report the events and contact third party servers 128 when specific communication events occur within the flow. The communication events may include but not limited to, duration of calls, starting and ending time of the calls, newly added agents and customers, allocations, de-allocations and the like. Per step 610, the lead assist layer 114 obtains the virtual numbers mapping from database 124, and responds with the correct agent or customer to which the call should be connected, via its call handling module 122.

Figure 7:
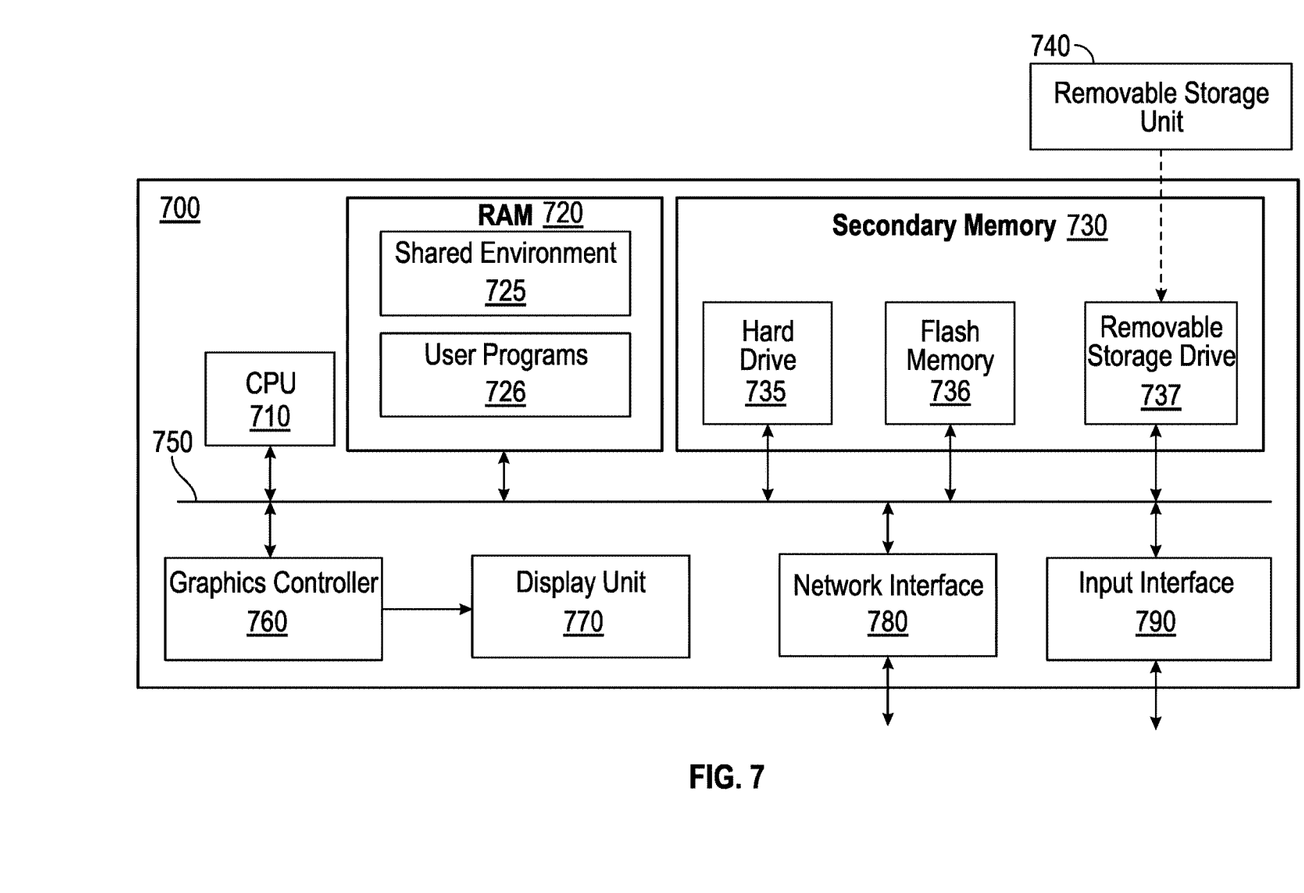
FIG. 7 is a block diagram illustrating the details of digital processing system in which various aspects of the present disclosure are operative by execution of appropriate software instructions.

FIG. 7 is a block diagram illustrating the details of digital processing system 700 in which various aspects of the present disclosure are operative by execution of appropriate software instructions. Digital processing system 700 may correspond to server system 102 (or any other system in which the various features disclosed above can be implemented).

Digital processing system 700 may contain one or more processors such as a central processing unit (CPU) 710, random access memory (RAM) 720, secondary memory 727, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions, such as those used in threads and stacks, constituting shared environment 725 and/or user programs 726. Shared environment 725 includes operating systems, device drivers, virtual machines, etc., which provide a (common) run time environment for execution of user programs 726.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems (such as those shown in FIG. 1, network 126a and network 126b) connected to the network.

Secondary memory 730 may contain hard drive 735, flash memory 736, and removable storage drive 737. Secondary memory 730 may store the data software instructions (e.g., for performing the actions noted above with respect to the Figures), which enable digital processing system 700 to provide several features in accordance with the present disclosure.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EEPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

The invention claimed is:

1. A system for allocation and management of shared virtual numbers, comprising:
   an external server authorized to request a lead assist layer for allocation and de-allocation of virtual numbers among agents and customers over a network, whereby the lead assist layer comprises an allocation module configured to allocate a first virtual number for establishing mapping between a first agent and a first customer, to enable a call initiated on a public telephone network to be bridged between said first agent and said first customer through a private branch exchange, and further configured to allocate said first virtual number for establishing mapping between a second agent and a second customer, to enable a call initiated on said public telephone network to be bridged between said second agent and said second customer through said private branch exchange;
   a de-allocation module configured to de-allocate said first virtual number mapping between at least the first agent and the first customer, wherein said de-allocation of said first virtual number mapping deactivates said first virtual number only between the first agent and the first customer for a predetermined time; and
   a call handling module configured to obtain mappings for said first virtual number, wherein said mappings are used by said call handling module to establish communication between corresponding agents and customers, wherein said communication established between said corresponding agents and customers is carried out via a call first originating on said public telephone network, said call being then routed to said private branch exchange system that is integrated with a call control layer, which in turns connects with said lead assist layer via said network, and further wherein unmapped agents and customers are enabled to communicate with one of said first agent, first customer, second agent and second customer using PIN numbers associated with at least one of said first virtual number and second virtual number, with said PIN numbers being collected using dual tone multi-frequency commands via a telephone and transmitted over said public telephone network to said call control layer.

2. The system of claim 1, wherein the allocation module is configured to allocate a second virtual number for establishing mapping between the first agent and the second customer.

3. The system of claim 2, wherein a database is configured to store and retrieve the allocation and de-allocation of said first virtual number and said second virtual number.

4. The system of claim 1, wherein a unique identifier generated during the allocation of said first virtual number, said unique identifier used for retrieving details of said mapping between the first agent and the first customer.

5. The system of claim 1, wherein a third virtual number is purchased, when no current virtual numbers are available for allocation by the allocation module.

6. The system of claim 1, wherein said first virtual number's state is changed to a vault state upon said de-allocation module receiving a de-allocation request from said external server.

7. A method of allocating and managing shared virtual numbers, said method being performed at least in part in a digital processing system, said method comprising:
    receiving a request from an external server, over a network, for allocation and de-allocation of virtual numbers among agents and customers;
    allocating, at a first time instance, a first virtual number to be mapped between a first agent and a first customer, to enable a call initiated on a public telephone network to be bridged between said first agent and said first customer through a private branch exchange;
    allocating, at a second time instance, said first virtual number to be mapped between a second agent and a second customer, to enable a call initiated on said public telephone network to be bridged between said second agent and said second customer through said private branch exchange;
    establishing communication between corresponding agents and customers, using said mappings, wherein establishing said communication between said corresponding agents and customers further comprising, originating a first call on said public telephone network, said first call being routed to said private branch exchange system, and further comprising, using PIN numbers associated with at least one of said first virtual number and said second virtual number to enable communication between unmapped agents and customers and with one of said first agent, first customer, second agent and second customer, with said PIN numbers being collected using dual tone multi-frequency commands via a telephone and transmitted over said public telephone network to a call control layer; and
    de-allocating, at a third time instance, said first virtual number mapping between the first agent and the first customer, wherein said de-allocation of said first virtual number mapping deactivates said first virtual number only between the first agent and the first customer for a predetermined time, wherein said deactivation prevents said first virtual number being allocated to another combination of a customer and an agent during said predetermined time.

8. The method of claim 7, wherein said allocating is performed by an allocation module, whereby said allocation module is configured to allocate a second virtual number for establishing a mapping between said first agent and said second customer.

9. The method of claim 7, further comprising, using a unique identifier generated during the allocation of said first virtual number for retrieving details of said mapping between the first agent and the first customer.

10. The method of claim 8, further comprising purchasing a third virtual number, when no current virtual numbers are available for allocation by said allocation module.

11. A non-transitory machine readable medium storing one or more sequences of instructions for enabling the allocation and management of shared virtual numbers using a system, wherein execution of said one or more instructions by one or more processors contained in said system enables said system to perform the actions of:
    receiving a request from an external server, over a network, for allocation and de-allocation of virtual numbers among agents and customers;
    allocating, at a first time instance, a first virtual number to be mapped between a first agent and a first customer, to enable a call initiated on a public telephone network to be bridged between said first agent and said first customer through a private branch exchange;
    allocating, at a second time instance, said first virtual number to be mapped between a second agent and a second customer, to enable a call initiated on said public telephone network to be bridged between said second agent and said second customer through said private branch exchange;
    establishing communication between corresponding agents and customers, using said mappings, wherein establishing said communication between said corresponding agents and customers further comprising, originating a first call on said public telephone network, said first call being routed to said private branch exchange system, and further comprising, using PIN numbers associated with at least one of said first virtual number and said second virtual number to enable communication between unmapped agents and customers and with one of said first agent, first customer, second agent and second customer, with said PIN numbers being collected using dual tone multi-frequency commands via a telephone and transmitted over said public telephone network to a call control layer; and
    de-allocating, at a third time instance, said first virtual number mapping between the first agent and the first customer, wherein said de-allocation of said first virtual number mapping deactivates said first virtual number only between the first agent and the first customer for a predetermined time, wherein said deactivation prevents said first virtual number being allocated to another combination of a customer and an agent during said predetermined time.

12. The non-transitory machine readable medium of claim 11, wherein said allocating is performed by an allocation module, whereby said allocation module is configured to allocate a second virtual number for establishing a mapping between said first agent and said second customer.

13. The non-transitory machine readable medium of claim 11, further comprising, using a unique identifier generated during the allocation of said first virtual number for retrieving details of said mapping between the first agent and the first customer.

14. The non-transitory machine readable medium of claim 12, further comprising purchasing a third virtual number, when no current virtual numbers are available for allocation by said allocation module.

* * * * *